(12) United States Patent
Wiggs

(10) Patent No.: US 8,109,110 B2
(45) Date of Patent: Feb. 7, 2012

(54) ADVANCED DX SYSTEM DESIGN IMPROVEMENTS

(75) Inventor: B. Ryland Wiggs, Franklin, TN (US)

(73) Assignee: Earth To Air Systems, LLC, Franklin, TN (US)

( * ) Notice: Subject to any disclaimer, the term of this patent is extended or adjusted under 35 U.S.C. 154(b) by 607 days.

(21) Appl. No.: 12/251,042

(22) Filed: Oct. 14, 2008

(65) Prior Publication Data

US 2009/0095442 A1     Apr. 16, 2009

Related U.S. Application Data

(60) Provisional application No. 60/979,264, filed on Oct. 11, 2007.

(51) Int. Cl.
F25D 23/12 (2006.01)

(52) U.S. Cl. .............. 62/260; 62/222; 62/224; 62/225

(58) Field of Classification Search .............. 62/260, 62/224; 236/92 B
See application file for complete search history.

(56) References Cited

U.S. PATENT DOCUMENTS

| | | |
|---|---|---|
| 2,503,456 A | 4/1950 | Smith |
| 3,099,140 A | 7/1963 | Leimbach |
| 3,183,675 A | 5/1965 | Schroeder |
| 3,452,813 A | 7/1969 | Watkins et al. |
| 3,986,345 A | 10/1976 | Pilz et al. |
| 4,010,731 A | 3/1977 | Harrison |
| 4,094,356 A | 6/1978 | Ash et al. |
| 4,169,554 A | 10/1979 | Camp |
| 4,182,133 A | 1/1980 | Haas et al. |
| 4,189,848 A | 2/1980 | Ko et al. |
| 4,224,805 A | 9/1980 | Rothwell |
| 4,257,239 A | 3/1981 | Partin et al. |
| 4,286,651 A | 9/1981 | Steiger et al. |
| 4,290,266 A | 9/1981 | Twite et al. |
| 4,325,228 A | 4/1982 | Wolf |
| 4,375,831 A | 3/1983 | Downing, Jr. |
| 4,378,787 A | 4/1983 | Fleischmann |
| 4,383,419 A | 5/1983 | Bottum |
| 4,392,531 A | 7/1983 | Ippolito |
| 4,437,813 A * | 3/1984 | Ingram ........................ 417/53 |
| 4,448,237 A | 5/1984 | Riley |
| 4,448,238 A | 5/1984 | Singleton et al. |
| 4,459,752 A | 7/1984 | Babcock |

(Continued)

FOREIGN PATENT DOCUMENTS

WO    WO-2004/027333 A2    4/2004

(Continued)

*Primary Examiner* — Cheryl J Tyler
*Assistant Examiner* — Jonathan Bradford
(74) *Attorney, Agent, or Firm* — Miller, Matthias & Hull LLP (57) ABSTRACT

A direct exchange geothermal heating/cooling system has a self-adjusting expansion valve and a bypass flow path to improve efficiency when the system operates in a heating mode. The expansion valve may operate based solely on pressure from the vapor refrigerant transport line. The system may alternatively include an accumulator, a compressor, and an oil separator, wherein an oil return line returns oil from the oil separator to the accumulator. Additionally, a direct exchange geothermal heating/cooling system may include a hot-gas bypass valve for diverting heated vapor refrigerant to the liquid refrigerant line. Finally, a direct exchange geothermal heating/cooling system having a sub-surface heat exchanger extending to a depth of at least 300 feet may use a refrigerant particularly suited for such an application.

8 Claims, 2 Drawing Sheets

U.S. PATENT DOCUMENTS

| | | |
|---|---|---|
| 4,536,765 A | 8/1985 | Kaminski |
| 4,538,673 A | 9/1985 | Partin et al. |
| 4,544,021 A | 10/1985 | Barrett |
| 4,700,550 A | 10/1987 | Rhodes |
| 4,715,429 A | 12/1987 | Mogensen |
| 4,741,388 A | 5/1988 | Kuroiwa |
| 4,798,056 A | 1/1989 | Franklin |
| 4,858,679 A | 8/1989 | Sakaya et al. |
| 4,858,694 A | 8/1989 | Johnson et al. |
| 4,867,229 A | 9/1989 | Mogensen |
| 4,936,110 A | 6/1990 | Kuckens |
| 4,993,483 A | 2/1991 | Harris |
| 5,025,634 A | 6/1991 | Dressler |
| 5,025,641 A | 6/1991 | Broadhurst |
| 5,029,633 A | 7/1991 | Mann |
| 5,038,580 A | 8/1991 | Hart |
| 5,054,297 A | 10/1991 | Furuhama |
| 5,062,276 A | 11/1991 | Dudley |
| 5,105,633 A | 4/1992 | Briggs |
| 5,131,238 A | 7/1992 | Meckler |
| 5,136,855 A | 8/1992 | Lenarduzzi |
| 5,199,486 A | 4/1993 | Balmer et al. |
| 5,207,075 A | 5/1993 | Gundlach |
| 5,224,357 A | 7/1993 | Galiyano |
| 5,275,008 A | 1/1994 | Song et al. |
| 5,277,032 A | 1/1994 | See et al. |
| 5,313,804 A | 5/1994 | Kaye |
| 5,381,672 A | 1/1995 | Haasis |
| 5,383,337 A | 1/1995 | Baker |
| 5,388,419 A | 2/1995 | Kaye |
| 5,419,135 A | 5/1995 | Wiggs |
| 5,461,876 A | 10/1995 | Dressler |
| 5,477,703 A | 12/1995 | Hanchar et al. |
| 5,477,914 A | 12/1995 | Rawlings |
| 5,533,355 A | 7/1996 | Rawlings |
| 5,560,220 A | 10/1996 | Cochran |
| 5,561,985 A | 10/1996 | Cochran |
| 5,564,282 A | 10/1996 | Kaye |
| 5,598,887 A | 2/1997 | Ikeda et al. |
| 5,622,057 A | 4/1997 | Bussjager et al. |
| 5,623,986 A | 4/1997 | Wiggs |
| 5,651,265 A | 7/1997 | Grenier |
| 5,671,608 A | 9/1997 | Wiggs et al. |
| 5,706,888 A | 1/1998 | Ambs et al. |
| 5,725,047 A | 3/1998 | Lopez |
| 5,738,164 A | 4/1998 | Hildebrand |
| 5,758,514 A | 6/1998 | Genung |
| 5,771,700 A | 6/1998 | Cochran |
| 5,816,314 A | 10/1998 | Wiggs et al. |
| 5,875,644 A | 3/1999 | Ambs et al. |
| 5,934,087 A | 8/1999 | Watanabe et al. |
| 5,937,665 A | 8/1999 | Kiessel et al. |
| 5,937,934 A | 8/1999 | Hildebrand |
| 5,941,238 A | 8/1999 | Tracy |
| 5,946,928 A | 9/1999 | Wiggs |
| 5,966,952 A * | 10/1999 | Misawa et al. .................. 62/159 |
| 6,138,744 A | 10/2000 | Coffee |
| 6,212,896 B1 | 4/2001 | Genung |
| 6,227,003 B1 | 5/2001 | Smolinsky |
| 6,276,438 B1 | 8/2001 | Amerman et al. |
| 6,354,097 B1 | 3/2002 | Schuster |
| 6,385,981 B1 * | 5/2002 | Vaisman ....................... 62/196.3 |
| 6,390,183 B2 | 5/2002 | Aoyagi et al. |
| 6,405,554 B1 * | 6/2002 | Kawakatu et al. .............. 62/335 |
| 6,450,247 B1 | 9/2002 | Raff |
| 6,521,459 B1 | 2/2003 | Schooley et al. |
| 6,615,601 B1 | 9/2003 | Wiggs |
| 6,751,974 B1 | 6/2004 | Wiggs |
| 6,789,608 B1 | 9/2004 | Wiggs |
| 6,892,522 B2 | 5/2005 | Brasz et al. |
| 6,931,879 B1 | 8/2005 | Wiggs |
| 6,932,149 B2 | 8/2005 | Wiggs |
| 6,971,248 B1 | 12/2005 | Wiggs |
| 7,080,524 B2 | 7/2006 | Wiggs |
| 7,146,823 B1 | 12/2006 | Wiggs |
| 7,191,604 B1 | 3/2007 | Wiggs |
| 7,234,314 B1 | 6/2007 | Wiggs |
| 7,401,641 B1 | 7/2008 | Wiggs |
| 2002/0132947 A1 | 9/2002 | Smith et al. |
| 2002/0194862 A1 | 12/2002 | Komatsubara |
| 2004/0168451 A1* | 9/2004 | Bagley ......................... 62/196.4 |
| 2005/0066674 A1* | 3/2005 | Hirota et al. .................... 62/222 |
| 2007/0068184 A1 | 3/2007 | Mueller et al. |
| 2007/0074847 A1 | 4/2007 | Wiggs |
| 2009/0320506 A1* | 12/2009 | Lifson et al. .................... 62/113 |

FOREIGN PATENT DOCUMENTS

| | | |
|---|---|---|
| WO | WO-2004/013551 A1 | 12/2004 |
| WO | WO-2005/114073 A2 | 12/2005 |
| WO | WO 2005114073 A2 * | 12/2005 |
| WO | WO-2007/046788 A2 | 4/2007 |

\* cited by examiner

ADVANCED DX SYSTEM DESIGN IMPROVEMENTS

CROSS-REFERENCE TO RELATED APPLICATION

The present application claims the benefit of U.S. Provisional Application Ser. No. 60/979,264, filed on Oct. 11, 2007, the entirety of which is incorporated herein by reference.

FIELD OF THE DISCLOSURE

The present disclosure relates generally to geothermal direct exchange/direct expansion ("DX") heating/cooling systems.

BACKGROUND OF THE DISCLOSURE

Geothermal ground source/water source heat exchange systems typically use fluid-filled closed loops of tubing buried in the ground, or submerged in a body of water, so as to either absorb heat from, or to reject heat into, the naturally occurring geothermal mass and/or water surrounding the buried or submerged fluid transport tubing. The tubing loop is extended to the surface for circulating the naturally warmed or cooled fluid to an interior air heat exchanger.

Older geothermal heating/cooling systems typically include three heat exchange steps. In a first heat exchange step, these systems circulate a fluid, which is typically water or water mixed with anti-freeze, in plastic (typically polyethylene) underground geothermal tubing, which transfers geothermal heat to or from the ground. In a second heat exchange step, a refrigerant heat pump system transfers heat to or from the water. Finally, in a third heat exchange step, an interior air handler (which may comprise finned tubing and a fan) transfers heat to or from a refrigerant to heat or cool interior air space.

More recent geothermal heating/cooling systems are called "direct exchange" or "DX" systems, which typically have only two heat exchange steps. In DX systems, the refrigerant fluid transport lines are placed directly in the sub-surface ground and/or water. The transport lines are typically made of copper tubing and the refrigerant fluid is typically R-22, R-410a, or the like, so that geothermal heat is transferred to or from the sub-surface elements in a first heat exchange step. A second heat exchange step transfers heat to or from an interior air space, typically by way of an interior air handler. Consequently, DX systems are generally more efficient than water-source systems because fewer heat exchange steps are required and because no water pump energy expenditure is necessary. Further, since copper is a better heat conductor than most plastics, and since the refrigerant fluid circulating within the copper tubing of a DX system generally has a greater temperature differential with the surrounding sub-surface elements than the water circulating within the plastic tubing of a water-source system, generally, less excavation and drilling is required, and installation costs are lower.

While the earlier DX heat exchange designs performed sufficiently for their intended use, various improvements have been made to enhance overall system operational efficiencies. Several such design improvements, particularly in direct expansion/direct exchange geothermal heat pump systems, are taught in U.S. Pat. No. 5,623,986 to Wiggs; in U.S. Pat. No. 5,816,314 to Wiggs, et al.; in U.S. Pat. No. 5,946,928 to Wiggs; and in U.S. Pat. No. 6,615,601 B1 to Wiggs, the disclosures of which are incorporated herein by reference. The systems disclosed in these patents encompass both horizontally and vertically oriented sub-surface geothermal heat exchanger. While these previous systems have improved the performance of DX systems, additional improvements in DX system operational efficiencies would be advantageous.

SUMMARY OF THE DISCLOSURE

Apparatus and methods are disclosed herein that will maintain or improve the operational efficiency of a DX system. Specifically, system efficiency may be maintained or improved by providing one or more of a functional self-adjusting heating mode expansion valve design; an optimum Polyolester type lubricating oil for use in conjunction with an R-410A refrigerant scroll compressor; a compressor that requires no lubricating oil; optimum placement of a filter/dryer in a reverse-cycle system operating in the cooling mode, and in the heating mode; a partial and limited hot-gas by-pass valve for initial system operation in the cooling mode at the end of an operational heating season; and a refrigerant that can be used in the cooling mode at depths in excess of 300 feet deep. Each of these features is discussed in greater detail below.

(1) A pressure only self-adjusting heating mode expansion valve ("XV"), with a bleed port and/or a by-pass line with a special orifice sized pin restrictor expansion device, will increase system operational efficiencies in the heating mode over a wide range of sub-surface temperature conditions, as opposed to conventional use of a manually adjusted valve, a pin restrictor expansion device, and/or a conventional self-adjusting thermostatic expansion valve ("TXVs" or "TEVs").

A conventional TXV, which is well understood by those skilled in the art, controls the refrigerant flow through the liquid line into the heat exchanger based on temperature and pressure parameters sensed from the vapor/suction line (i.e., where the line exits the sub-surface heat exchanger in the heating mode of a DX system). A period of time elapses, however, between when the temperature and pressure are sensed and when the TXV valve responds to these parameters. Fluid temperature and pressure may be transient and quickly change, and therefore the TXV valve response often lags the actual fluid conditions exiting the sub-surface heat exchanger. Consequently, a conventional TXV valve may continually change settings as it "hunts" for an optimum position. Hunting by the TXV valve, in turn, causes continuous pressure/temperature fluctuations that impair system performance and efficiency. This concern is unique to a DX system, as conventional air-source heat exchangers do not have exceptionally long refrigerant transport line sub-surface distances to contend with in their exterior heat exchange tubing.

The heretofore preferred method of eliminating the TXV "hunting" concern in a DX system application was to use either a manually adjusted expansion device or a pin restrictor expansion device. Manually adjusted valves must be manually changed for differing conditions, which is labor intensive, somewhat inaccurate, and undesirable. Pin restrictor expansion devices permit more accurately measured settings by using a small, precisely measured, hole, or orifice, in the center which permits a single preferred amount of refrigerant through the expansion device. While such a fixed size orifice is more accurate than a manually set valve and is far better than a TXV for use in a DX system, the pin restrictor expansion device does not permit optimum system operational efficiencies under changing sub-surface temperature conditions. Such changing conditions may occur, for example, when the ground immediately surrounding the sub-surface heat exchange tubing grows colder during the winter as more and more heat is withdrawn from the surrounding ground or other sub-surface environment.

The present heating mode expansion valve (referred to herein as an "XV" valve) provides a flexible orifice sizing that will optimize refrigeration flow through the expansion device, serving the outdoor, sub-surface, heat exchanger in a DX system, over a wide array of sub-surface temperature conditions, but will eliminate the "hunting" problem occasioned by conventionally designed TXVs.

The "XV" valve may further have a specially sized refrigerant bleed port, which improves operation of the valve based solely on pressure. The XV valve may eliminate the temperature sensing element and refrigerant filled bulb from a conventional TXV, and instead operate solely on the pressure sensed from the vapor/suction line returning from the field (i.e., the sub-surface heat exchanger of a DX system). However, testing has also shown that operational results can be significantly optimized by additionally providing a specially sized refrigerant bleed port within the XV valve itself and/or a by-pass line, with a specially sized pin restrictor expansion device, around the XV valve. The resulting liquid refrigerant special bleed, either through or around the valve, optimizes overall system operational efficiencies.

The XV valve may be similar to the lower body portion of a standard adjustable TXV valve, except that it is designed for a system that is 120% larger than the actual standard TXV valve for a particular load application. For example, a 2.5 ton load system should start with a 2.5 times 120%, or a 3 ton XV valve lower body portion. A standard TXV lower body portion has a screw adjustment on the bottom of the actual lower body portion of the standard adjustable TXV valve itself (not the round head), as is well understood by those skilled in the art. When this lower body portion is used as a part of the special XV valve, this screw may be optimally set at 2.5 turns counterclockwise (where each one full turn equals a 24 pound suction line psi adjustment) from a fully closed position, where, at a fully closed position, the adjustable set screw is tight against the bottom of the lower body portion of the XV valve and, fully closed, exerts a pressure of 150 psi, plus or minus 10%, with an R-410A refrigerant. Turning the adjustable screw counterclockwise opens the valve and decreases suction psi, but restricts refrigerant flow and increases head psi.

A conventional TXV has a rounded head top. A conventional TXV is normally situated within the liquid refrigerant transport line entering the heat exchanger. A conventional TXV normally contains a separate refrigerant fluid within a temperature sensing bulb, which bulb is attached to the exterior of the vapor line exiting the heat exchanger so as to sense changing temperature conditions. These changing temperature conditions result in either expanding or contracting the refrigerant fluid within the bulb and, contemporaneously, the small amount of refrigerant within the refrigerant line connecting the bulb to the rounded top head portion of the TXV, that transmits the resulting pressure change to the top of the diaphragm in the rounded head of the TXV valve, thereby exerting an appropriate force on the diaphragm based upon sensed temperature conditions. A conventional TXV also has a small refrigerant line connecting the vapor line exiting the heat exchanger with the lower body portion of the TXV valve, so as to simultaneously exert a force on the diaphragm of the lower body of the valve, based upon actual pressure conditions in the said vapor line. Thus, a conventional TXV regulates refrigerant flow into the heat exchanger via both temperature and pressure, as is well understood by those skilled in the art.

The rounded head of a conventional adjustable TXV may be removed and replaced with the rounded valve head of a conventional 3 ton automatic rounded valve head (that solely regulates using spring pressure, and not by using a sealed bulb of refrigerant fluid), which automatic rounded valve head is also well understood by those skilled in the art.

The XV valve may include a specially sized refrigerant bleed port within the XV valve itself, so as to provide a specially measured amount of refrigerant flow through the XV itself, and/or a refrigerant transport/flow by-pass line, with a specially sized fixed pin orifice expansion device within the by-pass line, which by-pass line travels around the XV valve so as to provide a specially measured amount of refrigerant flow around the XV valve itself.

The bleed port and/or pin restrictor orifice may be sized to optimize the operational efficiency of the system. Specifically, it has been found that a cross-sectional area of the orifice opening may be approximately 0.00018119616 square inches per ton of system design capacity, plus or minus 10%. Thus, for example, the optimized size of the orifice in the heating mode for a 2.5 ton system design would be approximately 0.0004529904 square inches (plus or minus 10%), which is equivalent to an orifice diameter of approximately 0.024 inches (e.g., 0.00018119616 times 2.5 tons equals 0.0004529904, which area corresponds to a an orifice having 0.024 inch diameter).

For locations where seasonally high ground temperatures at the end of the cooling season are a concern, the optimal cross-sectional area of the orifice (for the bleed port and/or the pin restrictor) is approximately 0.00032169984 square inches per ton of system design capacity, plus or minus 10%. Thus, for example, the size of the orifice, for maximum operational efficiencies in the heating mode for a 2.5 ton system design, where seasonally high ground temperatures at the end of the cooling season are a concern, would be the equivalent of a size 0.030 inch diameter orifice, with a 0.0008042496 square inch area, plus or minus 10%. Such a slightly larger orifice size will permit system operation within sub-surface temperatures of about 80 degrees F. without shutting the system off on high head pressure, and without significantly overheating the system's compressor beyond 195 degrees F.

In certain applications, multiple line sets (each having a vapor refrigerant transport line and a respective liquid refrigerant transport line) may be used. The optimum orifice sizing may be used on each individual line set to obtain relatively uniform refrigerant pressure throughout the system to avoid impairing operational efficiency of the system due to unequal refrigerant pressures.

(2) The use of an R-410A refrigerant in a DX system, and in a DX system with its sub-surface heat exchange tubing installed between 100 feet and 300 feet deep, in conjunction with a scroll compressor, in conjunction with a Copeland Ultra 32-3MAF polyester ("POE") lubricating oil for the scroll compressor, in conjunction with an oil separator, a coalescent filter oil separator being preferred, with an internal filter capable of filtering dirt and effluent down to 0.3 microns (typical conventional filter/dryers only filter down to 50 microns), in conjunction with the oil separator preferably returning oil, by means of an oil transport return line, to the suction line to one of the system's accumulator and suction line to the accumulator. Returning oil to the accumulator has two advantages over a conventional oil separator's oil return directly to the compressor, in that it provides hot oil to evaporate any liquid refrigerant in the accumulator, and in that the compressor receives a metered amount of steadier oil return via the oil suction orifice within the accumulator. Testing has shown that other types of POE oil, such as an Emkarate RL 100 Polyolester, a Copeland Ultra 22CC Polyolester, a Mobil EAL 22CC Polyolester, an Emkarate RL 22 Polyolester, or an Emkarate 32CF Polyolester will not work as efficiently and may result in system operational problems after extended run times in a DX system with a scroll compressor.

(3) Utilization of at least one of a magnetic bearing compressor and a compressor with solid state lubricated moving parts in a DX system application, so as to eliminate the need for any lubricating oil. Eliminating the oil in a DX system has several advantages. One is that there is no possibility of any adverse or damaging chemical reaction between the refrigerant used and the oil. Others are that there is no oil and oil film coating on the interior sides of refrigerant transport tubing to impair optimum refrigerant flow rates or to impair heat transfer. Another advantage is that, by eliminating the oil, the necessity for an oil separator (in heat mode or in reverse-cycle DX systems operating with sub-surface heat exchange tubing at depths greater than 100 feet) is also eliminated, together with potential oil separator concerns, such as a slight refrigerant operational pressure loss, and such as a damaged float, or the like.

(4) Normally, one conventionally sized filter/dryer is used in most any conventional heat pump system. The conventional filter/dryer used typically matches the system design tonnage. For example, a three ton conventional heating/cooling system would normally use only one three ton filter/dryer, as is well understood by those skilled in the art. However, field testing has shown that, with a DX system, which normally requires field line brazing, at least a 120% oversized filter/dryer should preferably be placed in the liquid refrigerant transport line on each respective side of the subject pressure only self-adjusting heating mode expansion valve and its refrigerant transport by-pass line, so as to prevent brazing or other debris from impairing XV valve operation. The placement of such an oversized filter/dryer on each side of the XV and its by-pass line prevents debris from impairing the XV, regardless of whether initial system refrigerant charging is in the heating mode or in the cooling mode. The filter/dryer should be at least 120% oversized (meaning a two and a half ton system should use three ton filter/dryer sizes) so as not to impair critical design refrigerant flow through the particular sub-surface heat exchange field use.

(5) At the end of a heating season, the ground immediately surrounding the sub-surface heat exchange tubing of a DX system can be near or below freezing. The cold ground acts like a magnet, in addition to gravity, and tends to keep the cold liquid refrigerant in the ground, as refrigerant normally naturally migrates to the coldest area of a system.

Conventional air-conditioning TXVs, which are typically used on interior air-handlers in a DX system, and which are well understood by those skilled in the art, were not designed to operate with relatively cold, only partial liquid state, refrigerant entering the TXV. When refrigerant temperatures are at, or below, the 46 degree F. range, plus or minus 10%, the normal operation of a conventional TXV results in two problems in a DX system design. First, the liquid refrigerant flow is too restricted and impairs adequate liquid flow from the field. Second, the drop in pressure and temperature of the refrigerant after it passes through the TXV and enters the interior air-handler results in temperatures below freezing within the interior air handler, which results in freezing condensed moisture on the interior air-handler's heat exchange finned tubing, thereby blocking design airflow and inhibiting efficient system operation. While, as discovered by Wiggs, at least one of a correctly sized bleed port within the TXV and a fixed orifice by-pass around the TXV will materially help resolve the resulting problems, when the sub-surface ground around the exterior heat exchange tubing is materially below freezing, icing on the interior air handler heat exchange tubing can still temporarily result.

A means of solving the subject problem is desirable and would consist of a partial and limited hot-gas by-pass valve for initial system operation in the cooling mode at the end of an operational heating season.

The partial and limited hot-gas by-pass valve, which is disposed in the vapor refrigerant transport line exiting the compressor in the cooling mode, may have temperature and/or pressure control means, so as to sense at least one of temperature and pressure conditions in the liquid refrigerant transport line returning refrigerant from the sub-surface heat exchanger. The valve may operably connect, with a hot gas by-pass refrigerant transport line, the vapor refrigerant transport line exiting the system's compressor, before the vapor line reaches and enters the sub-surface heat exchanger below the ground surface, to the liquid refrigerant transport line exiting the sub-surface heat exchanger (not shown), prior to the liquid line's entry into the expansion device (typically a TXV) for the interior heat exchanger (typically an air-handler), so that the control means only permits enough hot gas refrigerant flow out of the compressor to mix with the cold partially liquid refrigerant out of the sub-surface heat exchanger so as to warm the refrigerant mixture (not shown) to a point above 46 degrees F. (about 133 psi when the system is operating on R-410A refrigerant), plus or minus 10%, all while not excessively warming the refrigerant mixture above 51 degrees F. (about 145 psi when the system is operating on R-410A refrigerant), plus or minus 10%. At the point where the liquid line refrigerant mixture (not shown) entering the expansion device for the interior heat exchanger reaches a temperature above 51 degrees F., plus or minus 10%, the valve would automatically close shut and would cease to inject hot gas into the cooled liquid line entering the expansion device for the interior heat exchanger, so as not to impair normal cooling mode operational efficiencies.

Only as little as possible hot gas from the compressor should be diverted into the liquid refrigerant transport line exiting the sub-surface heat exchanger (not shown), at a location prior to the expansion device for the interior heat exchanger, so as not unduly prevent the hot gas from the compressor promptly warming up the sub-surface heat exchange area to the point where the partial and limited hot gas by-pass valve will not be required.

Additionally, a check valve may be placed in the hot gas by-pass refrigerant transport line, which is the line connecting the compressor's hot gas, discharge, vapor refrigerant transport line with the liquid refrigerant transport line exiting the sub-surface heat exchanger (not shown). The check valve will permit the flow of refrigerant, when called for by the valve, when operating in the cooling mode, but will prevent the flow of refrigerant in the opposite direction when the system is operating in the heating mode (when the liquid line from the interior heat exchanger, usually an air handler, which air handler is well understood by those skilled in the art, is at a higher pressure than the low pressure vapor refrigerant exiting the sub-surface heat exchanger). Alternately, the check valve may be installed within the partial and limited hot gas by-pass valve itself, as would be well understood by those skilled in the art.

(6) A DX system using an R-744 refrigerant for operational depths in excess of 300 feet deep, so as to offset the negative effects of gravity when operating in the cooling mode.

Initially, due to gravitational restraints of the return liquid refrigerant in the cooling mode, and due to compressor lubrication oil return issues, no early technology DX systems had been able to efficiently operate at depths beyond 100 feet. However, via the use of a unique oil separator device designed by Wiggs, and due to testing by Wiggs that demonstrated an R-410A refrigerant, operating at higher pressures than conventional R-22 systems, would assist in liquid refrigerant return from greater depths, the use of an R-410A refrigerant, in conjunction with an oil separator, and other design improvements taught by Wiggs, enabled efficient DX system operation at depths of about 300 feet.

DX systems that include wells/boreholes in excess of 300 feet deep, thereby to further reduce drilling surface area requirements, may use a refrigerant other than R-410A. Specifically, applicant's testing has shown that R-744 refrigerant would be functional for such an application.

R-744 is not commonly used in heat pump systems because the ambient air is commonly used to condense the refrigerant fluid into a liquid in the cooling mode. When a refrigerant is condensed from a vapor to a liquid, the phase change advantageously transfers a large amount of BTUs. To execute the phase change, however, warm refrigerant vapor must be exposed to a sufficiently cool heat transfer medium. Since the critical temperature of R-744 is only about 88 degrees F. (about 31 degrees C.), and since summer air is often in excess of 88 degrees F., R-744 has not commonly been used for cooling purposes in conventional air-source heat pump system designs. While R-744 can be used for heat transfer purposes above 88 degrees F., the significant value of phase change characteristics are lost. Thus, in a conventional heat pump system application, using the exterior air as a heat sink, the value of R-744 as a refrigerant is somewhat limited to use in ambient air temperatures of around 68 degrees F. (20 degrees C.).

However, as one increases system operational pressures, the temperature of the R-744 increases, so that it is possible to use R-744 as a cooling medium in anticipated outdoor summer air temperatures of about 100-130 degrees F., so long as the condensing pressures would range from about 1,323 psi to 1,911 psi (about 90 bar to 130 bar), which are much higher than any DX system heretofore ever used. For example, an R-410A DX system never realistically sees operating pressures over 425 psi, and conventional design R-22 DX systems have even lower operating pressures. These 1,323 psi to 1,911 psi condensing pressures are more than twice the condensing pressure of R-410A. For example, for comfort cooling with R-744, with an evaporating temperature of about 44 degrees F., the corresponding system operational pressure would be about 600 psi, which is almost the same condensing pressure of R-410A.

However, in a DX system application, the sub-surface environment is typically in the 50 to 65 degree F. range (10 to 18 degrees C.) in most of North America. Thus, in a DX system application, the use of R-744 is practical, particularly as R-744 heat pump systems operate at higher pressures than R-410A, which extensive analysis has indicated will provide acceptable liquid refrigerant return properties in the cooling mode from depths in excess of 300 feet in a deep well DX system application.

The higher system operational pressures of R-744, combined with satisfactory phase change temperature ranges, will enable a deep well DX system to operate at depths in excess of 300 feet, which, as explained, is highly advantageous since the extended depth system operational range reduces surface area requirements mandated via shorter drilling depth limitations. Testing by the applicant has shown that the higher operational pressures offset the adverse effects of gravity when a DX system is operating in the cooling mode via exerting more operational pressure on the condensed liquid that may be pushed/pulled out of the well, preferably via only the system's compressor during normal system cooling mode operation.

However, as the use of R-744 in conjunction with commonly used polyolester lubricants can result in carbonic acid concerns, the use of a compressor that has at least one of magnetic bearings and a solid state lubricant would be preferred in conjunction with the use of an R-744 very deep well DX (in excess of 300 feet deep) system application, so as to eliminate compressor lubrication and carbonic acid concerns.

BRIEF DESCRIPTION OF THE DRAWINGS

For a more complete understanding of the disclosed methods and apparatus, reference should be made to the embodiments illustrated in greater detail on the accompanying drawings, wherein.

It should be understood that the drawings are not necessarily to scale and the disclosed embodiments are sometimes illustrated diagrammatically in partial views. In certain instances, details which are not necessary for an understanding of the disclosed methods and apparatus, or which render other details difficult to perceive, may have been omitted. It should be understood, of course, that this disclosure is not limited to the particular embodiments illustrated herein.

DETAILED DESCRIPTION

The following detailed description is of the best presently contemplated mode of carrying out the disclosed subject matter. The description is not intended in a limiting sense, and is made solely for the purpose of illustrating the general principles of the disclosed subject matter. The various features and advantages of the present disclosure may be more readily understood with reference to the following detailed description taken in conjunction with the accompanying drawings.

Figure 1:
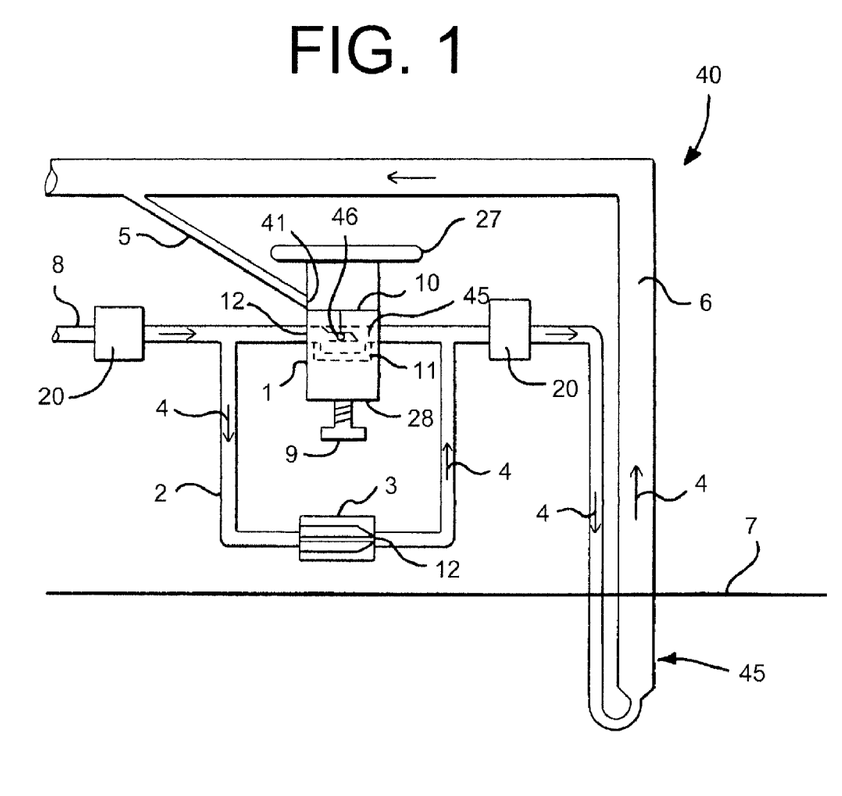
FIG. 1 shows a side view of a portion of a direct exchange geothermal heating/cooling system including a self-adjusting, heating mode expansion device with bypass line constructed according to the teachings of the present disclosure.

FIG. 1 shows a side view of a portion of a direct exchange geothermal heating/cooling system 40. The system 40 includes a vapor refrigerant transport line 6 and a liquid refrigerant transport line 8. The vapor and liquid transport lines 6, 8 may be operatively coupled to a compressor, an interior heat exchanger, and/or additional direct exchange system components, all of which are well known in the art and therefore are not shown in FIG. 1. While a majority of the system components are located above ground, lower portions of the vapor and liquid transport lines 6, 8 are disposed below a ground surface 7 to form a sub-surface heat exchanger, generally designated by reference numeral 45. The system 40 is operable in a heating mode in which a refrigerant is circulated through the transport lines 6, 8 in the direction indicated by arrows 4. The system 40 may further be operable in a cooling mode, in which the refrigerant is circulated through the transport lines 6, 8 in a direction opposite the arrows 4.

A heating mode expansion valve 1 (alternatively referred to herein as a "XV") may be disposed in the liquid transport line 8. The XV 1 includes a lower body portion 10 and an upper, rounded head portion 27. The lower body portion 10 defines a valve flow path 45 and a throttling element 46 adjustable to control fluid flow through the valve flow path 45. When the system operates in the heating mode, the vapor/suction line 6 exits the sub-surface heat exchanger to the lower body portion of the XV 1. The XV 1 is operably coupled to the liquid refrigerant transport line 8, which line 8 is shown as extending below the ground surface 7 on its way to the sub-surface heat exchanger (again, in the heating mode).

The lower body portion 10 of the XV 1 may be substantially identical to that of a standard, adjustable TXV, albeit with a sizing factor to adapt it for use in the XV 1. Standard TXVs are well understood by those of skill in the art, and therefore are not shown or described in detail herein. To adapt the standard TXV lower body for use as the XV lower body portion 10, however, it should be oversized to accommodate an overall system capacity that is approximately 120% larger than what is used in conventional TXV applications. For example, if the direct exchange geothermal system 40 has an overall capacity of 2½ tons, the XV lower body portion 10 may be a standard TXV lower body that is sized for a system overall capacity of 3 tons (i.e., 2½ tons times 120% equals 3 tons).

The lower body portion 10 of the XV 1 may further include a set screw 9 adjustably coupled to a bottom 28 of the XV lower body portion 10. The set screw 9 is operatively coupled to a spring (not shown) which applies a biasing force to the throttling element. The set screw 9 may be adjusted to change the resistance force applied to the throttling element, thereby to modify operation of the XV 1 according to refrigerant flow parameters.

The set screw 9 of the XV 1 may be set to an optimal position. The set screw 9 exerts the greatest amount of pressure when it is fully screwed into the bottom 28 to a closed position. In this position, a typical set screw/spring arrangement will cause a refrigerant pressure of approximately 150 psi, plus or minus 10%, for a DX system using R-410A refrigerant. Rotating the screw 9 counter-clockwise will open the throttling element of the XV 1, thereby decreasing suction pressure while restricting refrigerant flow and increasing head pressure. In this embodiment, the screw 9 may be optimally set at two and one-half turns counterclockwise from the closed position, where each full turn of the screw 9 may correspond to a pressure adjustment of 24 psi in the suction/vapor line 6.

The upper, rounded head portion 27 is different from the conventional rounded head of a TXV. A conventional TXV rounded head regulates using a contained refrigerant fluid pressure from temperatures sensed at the vapor refrigerant transport line 6. In this embodiment, however, the rounded head 27 comprises a conventional 3 ton automatic valve head which regulates using only spring pressure. Such a rounded head 27 is well understood by those skilled in the art and therefore is not shown herein in greater detail. To provide feedback pressure from the vapor transport line 6, the XV 1 includes a pressure port 41 that fluidly communicates with the vapor transport line 6 through a pressure sensing line 5.

A bypass flow path may be provided for communicating fluid along the liquid transport line 8 without being regulated by the throttling element of the XV 1. The bypass flow path may be either internal to the XV 1 through a bleed port 11, external to the XV 1 through a by-pass line 2 having a pin restrictor expansion device 3, or a combination of the two. As shown in FIG. 1, the by-pass line 2 has an inlet in fluid communication with the liquid transport line 8 upstream of the XV 1 and an outlet in fluid communication with the liquid transport line 8 downstream of the XV 1 (with the terms upstream and downstream referencing the flow of refrigerant during the heating mode, represented by arrows 4). Accordingly, the bypass fluid flow provides a specific amount of refrigerant flow along the liquid transport line 8 that is not subject to regulation via the XV 1. The bleed port 11 and pin restrictor expansion device 3 define bypass flow orifices that determine the amount of bypass flow therethrough. The bleed port 11 has an internal diameter which defines its bypass flow orifice, while the pin restrictor expansion device 3 has an orifice insert 12 that defines its bypass flow orifice.

Applicant has developed a bypass sizing factor which may be used to determine the optimal size for the bypass flow orifice, whether through the bleed port 11 or the orifice insert 12. The bypass sizing factor may be applied to the overall system capacity, which is typically identified in tons (where one ton equals 12,000 BTUs, as is well understood in the art). For the heating mode, the bypass sizing factor is approximately 0.00018119616 square inches, plus or minus 10%, per ton of capacity. For a 2½ ton system, for example, the optimal cross-sectional area of the bypass flow orifice is 0.0004529904 square inches (which is 0.00018119616 times 2.5), plus or minus 10%, which corresponds to a bypass flow orifice diameter of approximately 0.024 inches.

In certain applications, where conditions warrant, the bypass sizing factor may be adjusted. Where seasonally high ground temperatures at the end of the cooling season are a concern, the bypass sizing factor may be approximately 0.00032169984 square inches, plus or minus 10%, per ton of system capacity. A 2½ ton system designed for this environment, therefore, the bypass flow orifice would have an optimal cross-sectional area of 0.0008042496 square inches (which is 0.00032169984 times 2.5), plus or minus 10%, which corresponds to a bypass flow orifice diameter of approximately 0.030 inches. This orifice size is slightly larger than the in the above example, and permits system operation when sub-surface temperatures are as high as approximately 80 degrees F. without shutting the system off on high head pressure, and without significantly overheating the system's compressor beyond 195 degrees F.

The above-described XV 1 and optimized bypass flow orifice size may be used on each individual line set used in the system 40. Certain systems require multiple line sets to provide multiple sub-surface heat exchanger loops. Each line set comprises a vapor refrigerant transport line 6 and a respective liquid refrigerant transport line 8. To maximize system operational efficiencies, the refrigerant pressures in each line set should be substantially equal. Accordingly, the above-described XV 1 and optimized bypass flow orifice should be provided in each line set.

The system 40 may further include oversized filter/dryers in the liquid transport line 8 to prevent debris from impairing operation of the XV 1. Conventional heat pump systems typically employ a filter/dryer that is sized for the particular system's overall capacity. For example, a three ton conventional heating/cooling system would normally use only one three ton filter/dryer, as is well understood by those skilled in the art. For a DX system, however, applicant has found it advantageous to place two filter/dryers 20 in the liquid transport line 8, one on each respective side of the XV 1 (as well as on respective sides of the bypass line 2, if provided). Furthermore, the filter/dryers 20 may be oversized by a filter sizing factor of at least approximately 120%. In a 2½ ton system, for example, the filter/dryers 20 should be sized for a conventional 3 ton system. The placement of the oversized filter/dryers 20 prevents debris (such as from brazing) from impairing the XV 1, regardless of the direction of refrigerant flow during heating and cooling modes. The larger size of the filter/dryers 20 reduces any impact the filter/dryers 20 may have on the flow of refrigerant through the sub-surface heat exchange field.

Figure 2:
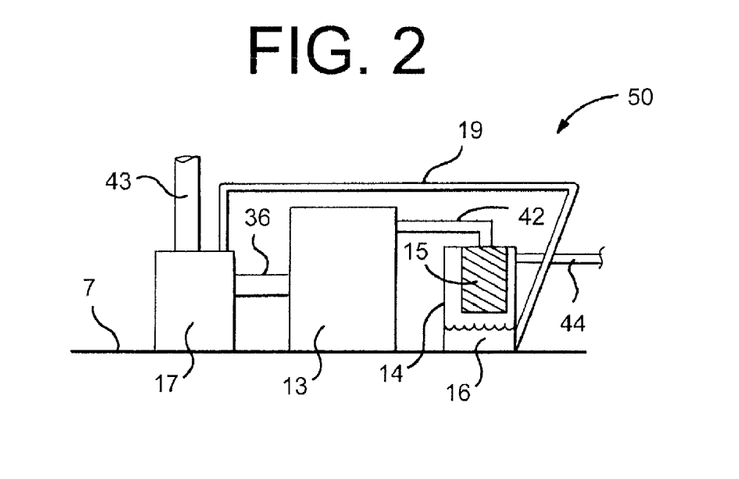
FIG. 2 is a side elevation view of a portion of a direct exchange geothermal heating/cooling system including an oil return line leading from an oil separator to an refrigerant accumulator constructed according to the teachings of the present disclosure.

FIG. 2 shows a side view of an alternative embodiment of a portion of a direct exchange geothermal heating/cooling system 50. The system 50 includes an accumulator 17 which fluidly communicates with a compressor 13 via a suction line 36. In turn, the compressor 13, which may be a scroll compressor, fluidly communicates with an oil separator 14 through a discharge line 42. An accumulator inlet line 43 and an oil separator outlet line 44 may be provided for connecting these components to the interior heat exchanger, sub-surface heat exchanger, and other components of a typical direct exchange geothermal heating/cooling system.

The oil separator 14 may include a filter 15 for removing dirt and effluent. The filter 15 may be a coalescent filter 15 capable of filtering down to 0.3 microns (typical filter/dryers filter down to 50 microns).

Additionally, an oil return line 19 may have an inlet in fluid communication with a bottom of the oil separator 14 and an outlet in fluid communication with the accumulator 17. The outlet of the oil return line may directly communicate with the accumulator 17 as shown, or may communicate directly to the accumulator inlet line 43, which in turn communicates with the accumulator 17. The oil 16 in the oil separator 14 is hot, and therefore returning the hot oil to the accumulator 17 will evaporate any liquid refrigerant that may collect in the accumulator 17. Additionally, return of oil to the accumulator 17 (instead of directly to the compressor as in conventional designs) ensures that the compressor 13 will receive a steady, metered amount of oil during operation.

The particular type of lubricating oil 16 used in the system 50 may be selected based on the type of system refrigerant to optimize system operational efficiency. For example, if the system 50 is using R-410A refrigerant, it may be advantageous to use Copeland Ultra 32-3MAF polyolester ("POE"), or the like, as the lubricating oil 16 for a scroll-type compressor 13. Conversely, testing has shown that other types of POE oil, such as an Emkarate RL 100 Polyolester, a Copeland Ultra 22CC Polyolester, a Mobil EAL 22CC Polyolester, an Emkarate RL 22 Polyolester, or an Emkarate 32CF Polyolester will not work as efficiently and may result in system operational problems after extended run times in a DX system with an R-410A scroll compressor 13.

While the compressor 13 is described above as a scroll compressor, other types of compressors may be used. For example, the compressor 13 may have magnetic bearings and/or solid state lubricated moving parts, thereby eliminating the need for lubricating oil 16. An oil-free compressor would further eliminate the need for the oil filter 15, the oil separator 14, or the oil return line 19.

Figure 3:
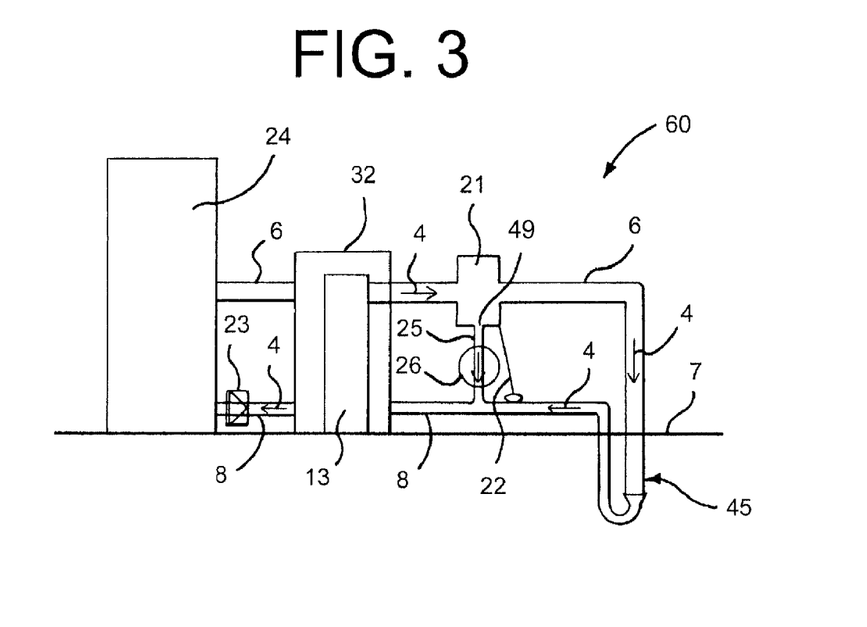
FIG. 3 is a side elevation view of a portion of a direct exchange geothermal heating/cooling system having a hot gas bypass valve constructed according to the teachings of the present disclosure.

A further alternative embodiment of a DX geothermal heating/cooling system 60 is illustrated in FIG. 3. The system 60 includes a partial and limited hot-gas by-pass valve 21 for initial system operation in the cooling mode at the end of a heating season.

The partial and limited hot-gas by-pass valve 21 is disposed in the vapor refrigerant transport line 6, which exits the compressor 13 in the cooling mode. The direction of refrigerant travel is shown by arrows 4. From the vapor transport line 6, the refrigerant travels to a sub-surface heat exchanger 45 (located below ground surface 7 and acting as a condenser in the DX system cooling mode, as is well understood by those skilled in the art). The bypass valve 21 may include at least one of a temperature and a pressure sensor 22, so as to sense at least one of temperature and pressure conditions in the liquid refrigerant transport line 8 that returns liquid refrigerant from the sub-surface heat exchanger. The valve 21 may include a bypass port 49 that fluidly communicates with the liquid transport line 8 through a hot gas by-pass refrigerant transport line 25. The valve 21 and bypass line 25 may be connected to the vapor transport line 6 at a point between the compressor discharge outlet and the sub-surface heat exchanger. Additionally, the bypass line 25 may be connected to the liquid refrigerant transport line 8 at a point between the sub-surface heat exchanger 45 and an expansion device 23. The expansion device 23 may be a TXV for an interior heat exchanger 24 (such as an air-handler).

The sensor 22 may be configured to generate a control signal in response to a measured parameter of the refrigerant in the liquid transport line 8. The control signal may be generated only when the measured parameter is within a specified range. The valve 21 will actuate in response to the control signal so that the bypass port 49 is open when the measured parameter is within the specified range. For example, the valve 21 may permit hot gas refrigerant to mix with the cold, partially liquid refrigerant out of the sub-surface heat exchanger and warm the refrigerant mixture to at least approximately 46 degrees F. (which corresponds to a refrigerant pressure of approximately 133 psi when the system is operating on R-410A refrigerant), plus or minus 10%, all while not excessively warming the refrigerant mixture above 51 degrees F. (about 145 psi when the system is operating on R-410A refrigerant), plus or minus 10%. Accordingly, the valve 21 may be configured to automatically close should the refrigerant mixture exceed approximately 51 degrees F., thereby ceasing injection of hot gas into the cooled liquid line 8 to avoid impairing normal cooling mode operational efficiencies.

Only as little as possible hot gas from the compressor 13 should be diverted into the liquid refrigerant transport line 8 exiting the sub-surface heat exchanger, at a location prior to the expansion device 23 for the interior heat exchanger 24, so as not unduly prevent the hot gas from the compressor 13 promptly warming up the sub-surface heat exchange area to the point where the partial and limited hot gas by-pass valve 21 will not be required.

Additionally, a check valve 26 may be placed in the hot gas by-pass line 25. The check valve 26 may be oriented to permit refrigerant flow through the bypass line 25 when operating in the cooling mode, but prevent refrigerant flow in the opposite direction when the system is operating in the heating mode (i.e., when the liquid line 8 from the interior heat exchanger 24, usually an air handler, is at a higher pressure than the low pressure vapor refrigerant exiting the sub-surface heat exchanger). Alternatively, the check valve 26 may be provided internally within the partial and limited hot gas by-pass valve 21.

Figure 4:
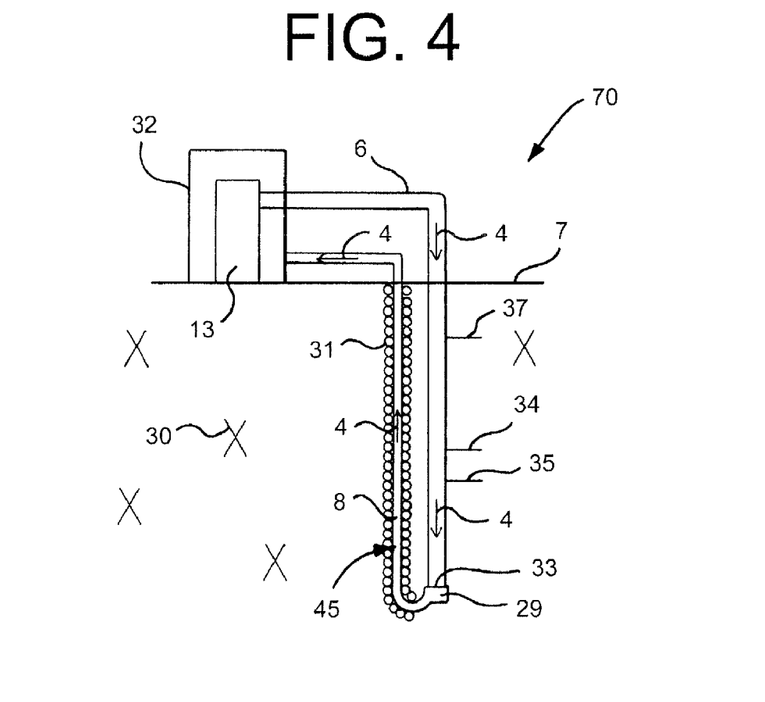
FIG. 4 is a side elevation view of a portion of a direct exchange geothermal heating/cooling system having a deep sub-surface heat exchanger and using a refrigerant particularly suited for a deep well application.

Yet another embodiment of a direct exchange geothermal heating/cooling system 70 is illustrated in FIG. 4. The system 70 includes a compressor 13 disposed in a containment box 32. The containment box 32 may further house additional components of the system 70, such as an accumulator, a reversing valve, and the like.

The compressor 13 may be any type of compressor, including a scroll compressor. Alternatively, the compressor 13 may be of a type that does not require lubricating oil, such as a magnetic bearing compressor or a compressor having solid state lubricants on all moving parts. Eliminating lubricating oil from the DX system 70 removes all oil film coatings on heat transfer tubing, and eliminates the need for an oil separator and pressure loss incurred thereby (an oil separator is typically required in reverse cycle DX systems when operating in the heating mode, and is also needed for heating-mode-only DX systems having sub-surface heat exchange lines extending more than approximately 100 feet below the ground surface 7), thereby improving system operational efficiency. Additionally, eliminating lubricating oil will reduce system construction costs and eliminate potential problems associated with oil separators, such as damaged internal floats and the like.

A vapor refrigerant transport line 6 extends from the compressor 13 and exits the containment box 32. A lower portion of the vapor transport line 6 is disposed below the ground surface 7 to form part of very deep well DX (a "VDWDX") system heat exchange tubing. The vapor transport line 6 has a bottom end 33 operably coupled to a liquid refrigerant transport line 8 by a coupling 29. A lower portion of the liquid transport line 8 is also disposed below ground to form the other part of the VDWDX tubing, and an upper portion of the liquid transport line 8 extends above the ground surface 7. The VDWDX refrigerant transport tubing extends to a very deep vertically oriented depth. For example, the VDWDX tubing may extend to a first point 34 located at a depth of approximately 300 feet, or to a second point 35 located at a depth of approximately 350 feet.

A refrigerant is circulated through the system 70, including the VDWDX transport tubing. A direction of flow of the refrigerant through the system 70 is indicated by arrows 4. The refrigerant is selected to have improved operational efficiencies when used in sub-surface tubing that extends to great vertical depths below the ground surface 7, such as at least approximately 300 feet or at least approximately 350 feet. One refrigerant suitable for use in such a system is R-744 refrigerant, which is capable of efficiently and functionally operating in a DX system with sub-surface heat exchange tubing installed at such depths.

The sub-surface portion of the vapor refrigerant transport line 6 is not insulated but instead is exposed to the earth 30, thereby to increase geothermal heat transfer. Conversely, the liquid refrigerant transport line 8 is fully insulated 31, thereby to avoid "short-circuiting" the geothermal heat gains/losses.

While only certain embodiments have been set forth, alternatives and modifications will be apparent from the above description to those skilled in the art. These and other alternatives are considered equivalents and within the scope of this disclosure and the appended claims.

What is claimed is:

1. A direct exchange geothermal heating/cooling system comprising:
    a vapor refrigerant transport line;
    a liquid refrigerant transport line;
    a sub-surface heat exchanger fluidly communicating with the vapor and liquid refrigerant transport lines;
    a heating mode expansion valve disposed in the liquid refrigerant transport line, the heating mode expansion valve including a head portion and a lower body portion defining a valve flow path, the heating mode expansion valve further including a throttling element disposed in the valve flow path and configured to regulate fluid flow through the valve flow path, wherein the throttling element is further configured to have a position that is responsive exclusively to a pressure level in the head portion; and
    a pressure sensing line fluidly communicating between the vapor refrigerant transport line and the head portion of the heating mode expansion valve.

2. The direct exchange geothermal heating/cooling system of claim 1, in which a refrigerant flows through the system in a heating mode direction to define a heating mode expansion valve inlet fluidly communicating with a heating mode upstream portion of the liquid refrigerant transport line and a heating mode expansion valve outlet fluidly communicating with a heating mode downstream portion of the liquid refrigerant transport line, the system further comprising a bypass flow path having an inlet in fluid communication with the liquid refrigerant transport line at a first point upstream of the valve throttling element and an outlet in fluid communication with the liquid refrigerant transport line at a second point downstream of the valve throttling, wherein the bypass flow path is separate from the valve flow path and permits a portion of refrigerant to flow around the heating mode expansion valve in the heating mode direction.

3. The direct exchange geothermal heating/cooling system of claim 2, further comprising a bypass flow orifice configured to regulate a bypass refrigerant flow through the bypass flow path.

4. The direct exchange geothermal heating/cooling system of claim 3, in which the system has a system capacity rated in tons, and in which the bypass flow orifice is sized using a bypass sizing factor based on the system capacity.

5. The direct exchange geothermal heating/cooling system of claim 4, in which the bypass sizing factor is approximately 0.00018119616 square inches, plus or minus 10% of 0.00018119616 square inches, per ton of system capacity.

6. The direct exchange geothermal heating/cooling system of claim 4, in which the bypass sizing factor is approximately 0.00032169984 square inches, plus or minus 10% of 0.00032169984 square inches, per ton of system capacity.

7. The direct exchange geothermal heating/cooling system of claim 3, further comprising a bypass line defining the bypass flow path and a pin restrictor expansion device disposed in the bypass line, wherein the bypass flow orifice is disposed in the pin restrictor expansion device.

8. The direct exchange geothermal heating/cooling system of claim 3, in which the heating mode expansion valve further comprises a bleed port defining the bypass flow path, wherein the bleed port defines the bypass flow orifice.

* * * * *